July 5, 1966 T. VIETORISZ 3,259,022
OBJECT SCANNING TECHNIQUES
Filed Dec. 17, 1963 4 Sheets-Sheet 1

INVENTOR
THOMAS VIETORISZ

BY Francis J. Thomas
ATTORNEY

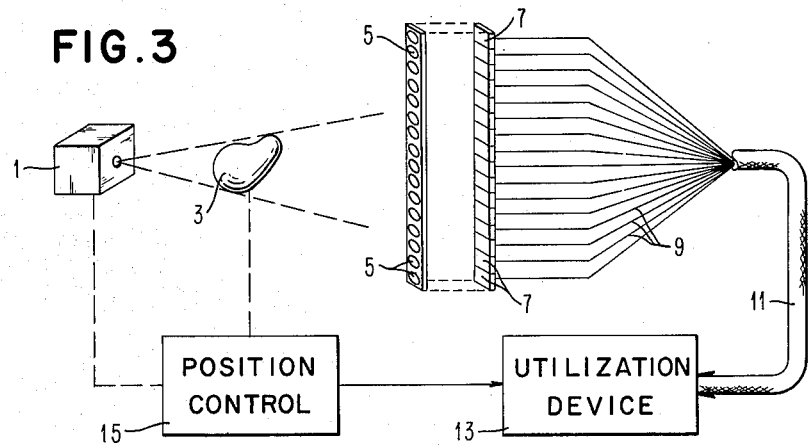
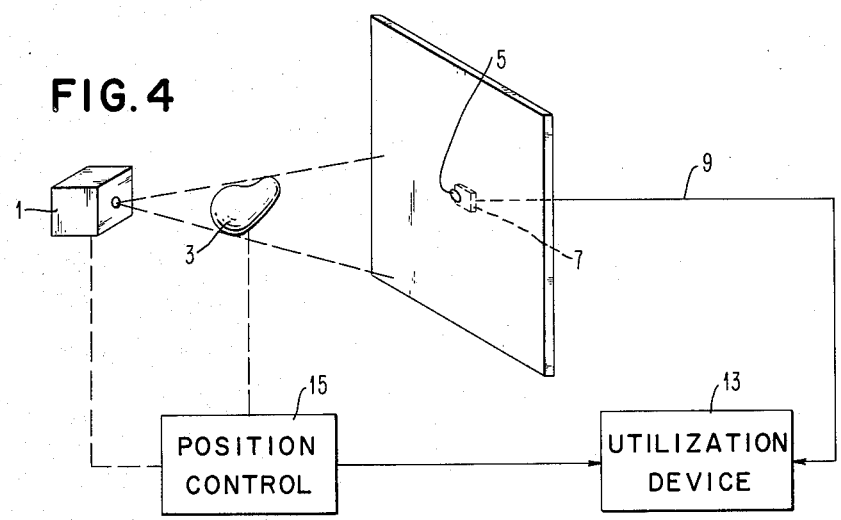
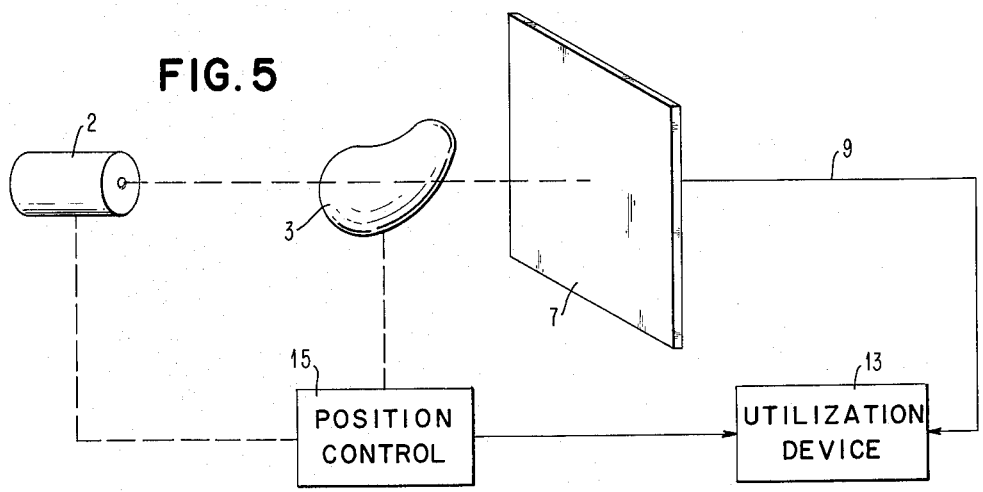

# United States Patent Office 3,259,022
Patented July 5, 1966

3,259,022
OBJECT SCANNING TECHNIQUES
Thomas Vietorisz, New York, N.Y., assignor to International Business Machines Corporation, New York, N.Y., a corporation of New York
Filed Dec. 17, 1963, Ser. No. 331,157
34 Claims. (Cl. 90—13.5)

This invention relates to techniques for scanning three-dimensional objects to provide indications of the shapes of the objects.

The shape of an object must be ascertained for many applications, such as when the object is to be reproduced or when certain parameters are to be calculated. In addition, various quality control efforts require accurate shape measurements.

Shape and contour measurements can be performed with mechanical instruments such as micrometers. These procedures are tedious and often inaccurate, especially when the object is soft or flexible. In addition, the cost and complexity of accurate mechanical measuring instruments is high. These disadvantages are often overcome by the use of optical measuring devices.

Most of the known optical shape and contour detecting devices are complicated in structure and limited in application. These devices generally require several sources of light and complex optical equipment and are limited to use with objects having extremely constrained shapes. Ordinarily, these devices are only capable of a partial analysis of the shape of the object.

The inventive object scanning techniques require only a single light source and are capable of use with objects having a great variety of shapes—the only limitation being that every point on the object must be able to support at least one tangent. Although indentations such as partially-drilled holes cannot be analyzed, saddle-shaped indentations and many others are capable of measurement.

In the present invention, the object is illuminated by a single source of light and the resulting shadow pattern is sensed as the light source and object are moved with respect to each other. In various embodiments, the shadow pattern is sensed by two-dimensional, one-dimensional and zero-dimensional light-responsive devices. The sensed shadow patterns are applied to utilization devices which reproduce the object or perform calculations to ascertain certain parameters.

It is, thus, an object of the present invention to show scanning techniques for analyzing the shape of objects.

Another object to provide indications of the shape of three-dimensional objects by producing shadow patterns as a source of light and the objects are moved with respect to each other.

Another object is to provide indications of the shape of three-dimensional objects by two-dimensional sensing of shadow patterns as a source of light and the objects are moved with respect to each other.

Another object is to provide indications of the shape of three-dimensional objects by two-dimensional sensing of shadow patterns as the object is moved with respect to a source of light.

A further object is to provide indications of the shape of three-dimensional objects by one-dimensional sensing of shadow patterns as a source of light and the objects are moved with respect to each other.

A further object is to provide indications of the shape of three-dimensional objects by one-dimensional sensing of shadow patterns as the object is moved with respect to a source of light.

A further object is to provide indications of the shape of three-dimensional objects by zero-dimensional sensing of shadow patterns as a source of light and the objects are moved with respect to each other.

A further object is to provide indications of the shape of three-dimensional objects by zero-dimensional sensing of shadow patterns as the object is moved with respect to a source of light.

A still further object is to show a reproduction technique under the control of shadow patterns that are produced when an object to be reproduced and a source of light are moved with respect to each other.

A still further object is to provide a technique for reproducing an object to scale wherein: the object and a source of light are moved with respect to each other; a piece of material from which the reproduction is to be made a cutting mechanism are similarly moved with respect to each other; and the shadow patterns of the object to be reproduced control the operation of the cutting mechanism.

The foregoing and other objects, features and advantages of the invention will be apparent from the following more particular description of preferred embodiments of the invention, as illustrated in the accompanying drawings.

In the drawings:

FIG. 3 is a diagram of a second preferred embodiment of the invention.

FIG. 4 is a diagram of a third preferred embodiment of the invention.

FIG. 5 is a diagram of a fourth preferred embodiment of the invention.

Figure 1:
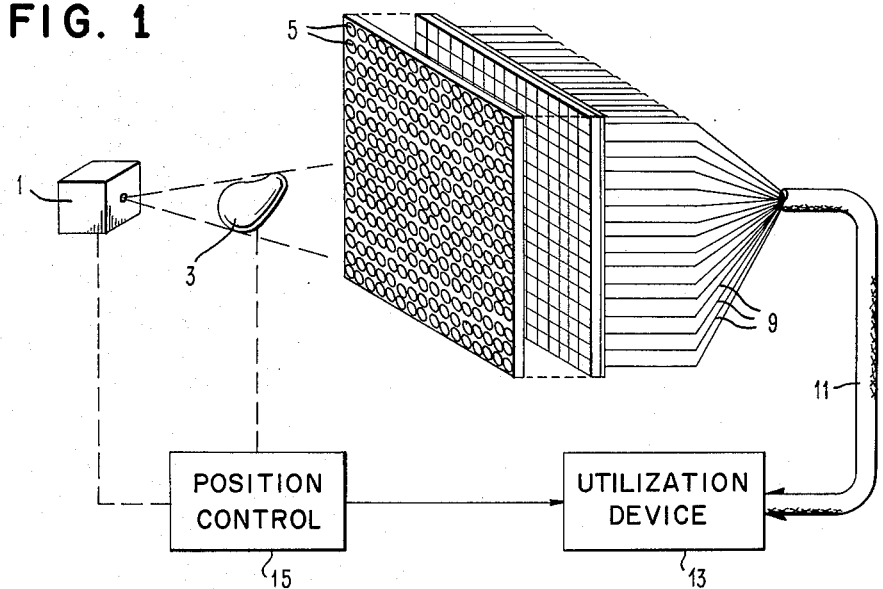
FIG. 1 is a diagram of a first preferred embodiment of the invention.

A first preferred embodiment of the invention is shown in FIGURE 1, where a point source of light 1 illuminates an object 3 to form a shadow pattern on a two-dimensional array of apertures 5. A photocell 7 is located directly behind each aperture for the purpose of providing an electric signal on a corresponding wire 9 in a cable 11 for application to a utilization device 13. A position control mechanism 15 causes the object 3 to be rotated on two axes and applies signals indicative of the position of the object to the utilization device 13. In the preferred embodiment, the object is rotated completely on a first axis, then the object (and the first axis of rotation) is moved slightly on a second axis that is perpendicular to the first axis, then the object is rotated again on the first axis. This process is continued until the object has been completely rotated once on the second axis. This particular positioning technique is preferred, but many two-parameter positioning schemes provide successful operation. For example, the axes need not be perpendicular, the light source or the array of apertures and photocells may be moved for one of the two parameters, and the rotational motion may be replaced with other (including linear) motions.

A computer can be employed as the utilization device 13 for the purpose of calculating various parameters such as the actual shape of the object in any coordinate system, the center of gravity of the object, etc. The computer can obviously be used to operate on the parameters in order to modify their values in some desirable sense. For example, when the object is crudely shaped, the computer can describe its surface with smooth curves which approximate the shape of the object, while overcoming its irregularities.

A reproduction device can also be used as the utilization device if a copy of the object is to be made—either with the same size or to scale. The reproduction device can copy the object subjected to prescribed functional transformations, such as elongation, bending or twisting. One such reproduction device is described subsequently with respect to FIG. 6.

Figure 2:
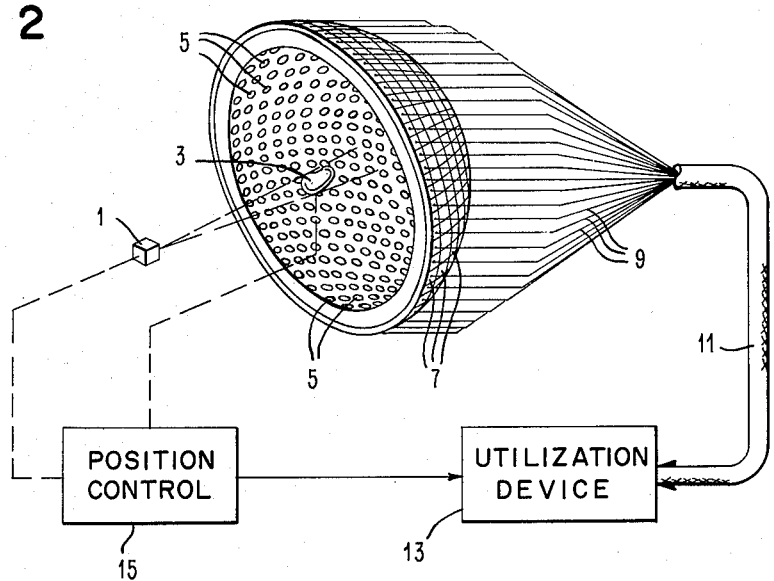
FIG. 2 is a diagram of an alternative version of the first preferred embodiment of the invention.

An alternative first embodiment is shown in FIG. 2, where a hemispheric array of apertures and photocells are employed. In this embodiment, the light source 1 is rotated as one of the two parameters of motion and the object is rotated on an axis lying in a plane that is parallel to the edge of the hemisphere. The light source is moved in a hemispheric plane which is a continuation of the hemispheric array of photocells. In other respects, the alternate embodiment shown in FIG. 2 operates in the same maner as the embodiment shown in FIG. 1. Obviously, the light source need not be moved in a hemispheric plane, but can be moved along a line or a flat plane or in many other configurations. Alternatively, the two parameters of motion can both affect the object, leaving the light source fixed. Although a hemispheric array of photocells is shown, any curved surface array can be employed.

A second preferred embodiment of the invention is shown in FIG. 3, where a one-dimensional array of apertures 5 and photocells 7 replaces the two-dimensional arrays shown in FIGS. 1 and 2. The apertures and photocells are preferably, but not necessarily, arranged along a straight line. A semi-circular arrangement can be used in the manner that a hemispheric arrangement is used in FIGURE 2. In this embodiment, three parameters of motion are employed, rather then two, because the dimensionability of the apertures and photocells is reduced from two dimensions to one dimension.

The object 3 can be moved through all three parameters (e.g. rotating on three mutually perpendicular axes) but, for simplicity, it is preferable to accomplish at least one parameter of motion with the source of light.

A third preferred embodiment of the invention is shown in FIG. 4, where a zero-dimensional "array," comprising a single aperture 5 and photocell 7 is employed. In this case, four parameters of motion are used. The object alone can be moved, as by rotation on three mutually-perpendicular axes and one lateral motion or, preferably, one or more parameters can be acomplished by motion of the light source.

A fourth preferred embodiment is shown in FIG. 5, where a collimated light source 2 and a large photocell 7 are used in conjunction with four parameters of motion. This embodiment is similar in operation to the third embodiment in that the presence or absence of only a narrow beam of light is detected. In the third embodiment shown in FIG. 4, a cone of light is generated by source 1, out of which a single beam is selected by the aperture 5, whereas, in FIG. 5 only a single beam of light is generated by source 2. Therefore, no aperture is required in conjunction with the large photocell 7.

Figure 6:
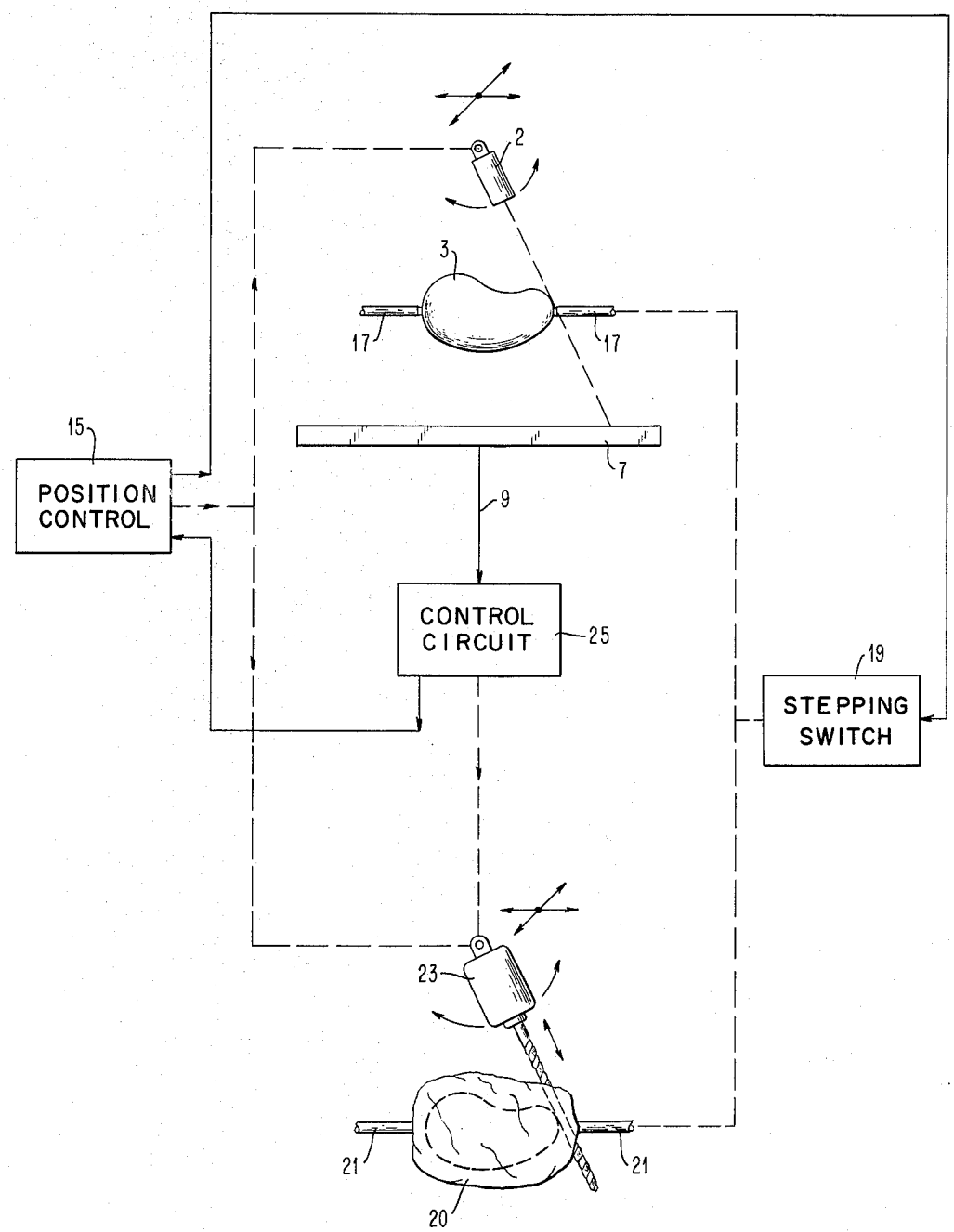
FIG. 6 is a detailed diagram of the fourth preferred embodiment of the invention.

The fourth preferred embodiment is shown in detail in FIG. 6 in conjunction with a reproduction system. The object 3 to be reproduced is mounted on two pins 17 for discrete rotational movement under the control of a stepping switch 19. The material 20 from which the copy is to be made is similarly mounted on two pins 21 for identical rotational movement. A collimated light source 2 and a "ray" cutter, embodied by an electric drill mechanism (or milling machine) 23, are identically mounted to permit two-dimensional lateral motion (crossed arrows) in a horizontal plane and rotation on an axis lying in a horizontal plane (curved arrows).

Initially, the drill bit is retracted and the light source and drill are located at positions wherein light strikes the photocell 7. The light source and drill are then rotated (as shown by the curved arrows) and, if the object is in the path of the light, the light to the photocell is blocked during part of the rotation. At the first instant that the light is blocked, a control circuit 25 (which is shown in detail in FIG. 7) supplies a signal to the position control mechanism 15 to halt the rotation of the light source and drill. The control circuit 25 also causes a drill cycle to take place wherein a hole is drilled in material 20. At the termination of the drill cycle, the rotation of the light source and drill is continued until light is again passed to the photocell 7. At this time, another drill cycle is indicated and another hole is drilled in the material. When this drill cycle is complete, rotation of the light source and drill is continued until the light is directed well beyond the object.

After rotation of the light source and drill, the position control mechanism 15 moves both the light source and the drill to another position in the horizontal plane and the light source and drill are rotated in the opposite direction (toward their initial positions). This operation is repeated for each of a large number of discrete positions of the light source and drill, and holes are drilled each time that the photocell senses a significant change in illumination (either from "white" to "black" or from "black" to "white"). During many rotations of the light source (and drill mechanism) no significant light changes occur because the object is not in the path of the light beam and, hence no holes are drilled.

Upon termination of the above operation, the position control mechanism 15 signals the stepping switch 19 which, in turn, causes both the object 3 and material 20 to be rotated slightly in preparation for repetition of the above described operation.

After this operation has been carried out for each position of the stepping switch, the material 30 has the same shape as the object 3, and the reproduction is complete. When the material is longer than the object (pins 21 are further apart than pins 17), the reproduction contains two pin-shaped extensions which correspond to the shape of pins 17. These extensions can be removed after the reproduction is complete.

The object 3 can be reproduced to the same size or can be reproduced to scale by varying the parameters of motion and distances in obvious ways. For example, the reproduction can be compressed in one dimension by utilizing lateral motions of the drill mechanism in one direction that are smaller than the corresponding motions of the light source, while keeping all other parameters of motion identical for both the light source and the drill.

Although a milling machine (drill) is shown as a cutting device, any other "ray" cutter can be employed including a laser beam or a fine saw. The ray cutter can also be replaced by a knife or saw which cuts into the material by amounts determined by the object scanner.

Greater accuracy can be obtained, if desired by a servo system which positions the light source at angles that provide light beams that are exactly tangential to the edges of the object. These systems hunt for the angle which provides a predetermined amount of light (between black and white) to the photocell, or are based on diffraction pattern analyses.

Figure 7:
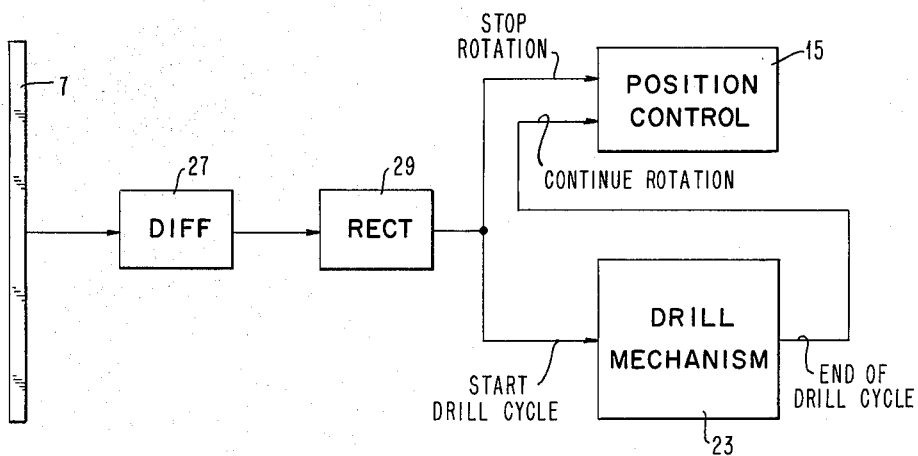
FIG. 7 is a detailed diagram of a control circuit which is suitable for use in the embodiment that is shown in FIG. 6.
Figure 8:
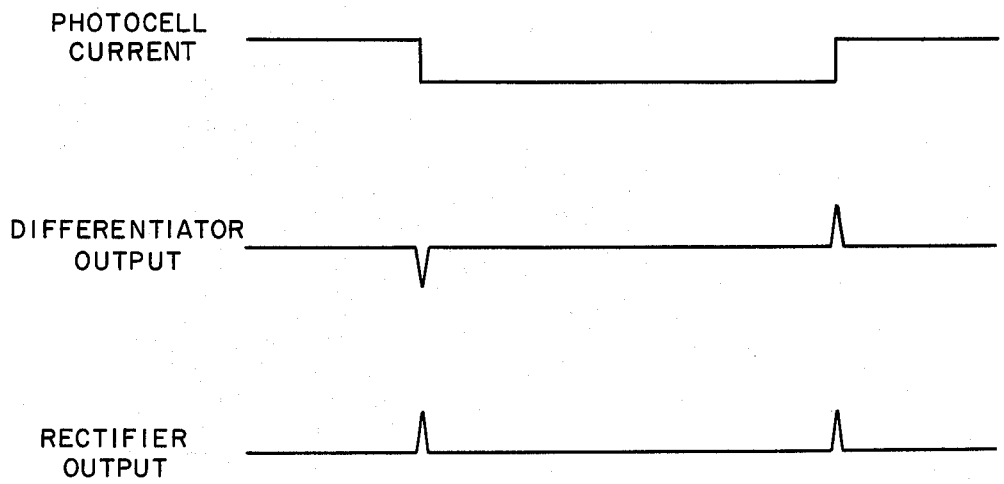
FIG. 8 is a group of timing diagrams illustrating the operation of the control circuit that is shown in FIG. 7.

A control circuit which is suitable for use in the preferred embodiment of FIG. 6 is shown in detail in FIG. 7 and several related timing diagrams are shown in FIG. 8. As the light source 2 (FIG. 6) is rotated, the photocell 7 (FIGS. 6 and 7) provides current as shown in FIG. 8, where the current is low for those angles of rotation where the beam of light impinges upon the object. The signal from the photocell 7 is applied to a differentiator circuit 27 (FIG. 7) which generates pulses as shown in FIG. 8. These bipolar pulses are rectified in a circuit 29 (FIG. 7) to provide pulses of a single polarity as illustrated in FIG. 8. The rectifier output pulses are applied to stop the rotation of the light source 2 and drill mechanism 23 (FIG. 6), and to start drill cycles. The drill mechanism 23 (FIG. 7) provides a signal when the drill cycle is terminated (after the drill has cut a hole and has been withdrawn from the material) to continue the rotation of the light source 2 and drill mechanism 23.

The inventive scanning techniques utilize shadow patterns in a variety of embodiments to enable the shape of an object to be ascertained. These techniques are extremely versatile and can be used with objects having a wide range of shapes, including various types of indentations as well as holes or other openings extending completely through the object.

Although the invention is embodied to employ visible light, ultraviolet or infrared light, X-rays, radar beams and particle beams of macroscopic dimension (five sprays), atomic dimensions (mass spectograph type beams), or subatomic dimensions (protons, neutrons etc.) can be used. In general, any type of radiation, ray, bundle of rays or cone of rays can be employed.

While the invention has been particularly shown and described with reference to preferred embodiments thereof, it will be understood by those skilled in the art that various changes in form and details may be made therein without departing from the spirit and scope of the invention.

What is claimed is:

1. An apparatus for scanning a three-dimensional object comprising, in combination:
    a single source of radiation directed toward the object;
    a radiation-sensitive surface;
    and means for sequentially altering the relative position of the source, the object and the surface so that regions of the object are examined by tangential radiations during the alternation.

2. The apparatus described in claim 1, wherein the radiation-sensitive surface is two-dimensional.

3. The apparatus described in claim 1, wherein the radiation-sensitive surface is one-dimensional.

4. The apparatus described in claim 1, wherein the radiation-sensitive surface is zero-dimensional.

5. The apparatus described in claim 2, wherein the radiation-sensitive surface is a curved, two-dimensional surface.

6. The apparatus described in claim 2, wherein the radiation-sensitive surface is a hemispheric surface.

7. The apparatus described in claim 2, wherein the radiation-sensitive surface is a flat, two-dimensional surface.

8. The apparatus described in claim 3, wherein the radiation-sensitive surface is a straight line.

9. The apparatus described in claim 1, wherein the radiation is uncollimated light.

10. The apparatus described in claim 1, wherein the radiation is collimated light.

11. The apparatus described in claim 4, wherein the radiation is uncollimated light.

12. The apparatus described in claim 4, wherein the radiation is collimated light.

13. The apparatus described in claim 2, wherein the means for altering the relative positions imparts two parameters of motion.

14. The apparatus described in claim 3, wherein the means for altering the relative positions imparts three parameters of motion.

15. The apparatus described in claim 4, wherein the means for altering the relative positions imparts four parameters of motion.

16. The apparatus described in claim 12, wherein the means for altering the relative positions imparts four parameters of motion.

17. The apparatus described in claim 1, wherein only the object is moved.

18. The apparatus described in claim 2, wherein only the object is moved.

19. The apparatus described in claim 3, wherein only the object is moved.

20. The apparatus described in claim 4, wherein only the object is moved.

21. The apparatus described in claim 12, wherein only the object is moved.

22. The apparatus described in claim 12, wherein the light source is moved throughout a plane and rotated on an axis that is parallel to the plane, and wherein the object is rotated on an axis that is parallel to the plane.

23. An apparatus for shaping a material into a form that bears a predetermined relationship to the form of a three-dimensional object comprising, in combination:
    a single point source of light directed toward the three-dimensional object;
    a light-sensitive surface that is predetermined to receive shadow patterns of the object;
    a controllable ray cutter;
    means for three-dimensionally sequentially altering the relative position of the source and the object while three-dimensionally altering the relative positions of the ray cutter and the material, the relative position of the ray cutter and the material being at the same relative position as the relative position of the light source and the object;
    and means responsive to the illumination of the light-sensitive surface for energizing the ray cutter to form the material to the three-dimensional object.

24. The apparatus described in claim 23, wherein the light is collimated and the light-sensitive surface is not responsive to the position on its surface whereat the light impinges.

25. The apparatus described in claim 24, wherein the ray cutter is energized when the light impinging upon the surface changes by a predetermined amount during positioning.

26. The apparatus described in claim 24, wherein the ray cutter is energized when the beam of light crossed an edge of the object.

27. The apparatus described in claim 26, wherein the ray cutter comprises a drilling mechanism.

28. An apparatus for shaping a material into a form that bears a predetermined relationship to the form of an object comprising, in combination:
    controllable means for positioning a rotatable source of collimated light at a point on a first plane, where the axis of rotation is parallel to the first plane;
    controllable means for positioning a rotatable ray cutter at a point on a second plane, where the axis of rotation is parallel to the second plane;
    controllable means for rotating the object on a first axis which is located at a predetermined position with respect to the first plane;
    controllable means for rotating the material on a second axis which is located at a predetermined position with respect to the second plane;
    a light-sensitive surface that is positioned to receive shadow patterns of the object;
    control means for imparting motion to the light source, object, cutter and material wherein the relative position of the cutter to the material bears a predetermined relationship to the relative position of the light source and the object;
    and means responsive to the illumination of the light-sensitive surface for energizing the cutter.

29. The apparatus described in claim 28, wherein the first axis is parallel to the first plane and the second axis is parallel to the second plane.

30. The apparatus described in claim 28, wherein the relative position of the first axis and the first plane bears a predetermined relationship to the relative position of the second axis and the second plane.

31. The apparatus described in claim 30, wherein the light-sensitive surface is not responsive to the position on its surface whereat the light impinges.

32. The apparatus described in claim 31, wherein the ray cutter is energized when the light impinging upon the surface changes by a predetermined amount during positioning.

33. The apparatus described in claim 31, wherein the ray cutter is energized when the beam of light crossed an edge of the object.

34. The apparatus described in claim 33, wherein the ray cutter comprises a drilling mechanism.

References Cited by the Examiner
UNITED STATES PATENTS

| | | | |
|---|---|---|---|
| 1,801,200 | 4/1931 | Howell | 90—13 |
| 2,113,899 | 4/1938 | Oram | 250—222 |
| 2,595,993 | 5/1952 | Templeman et al. | 250—221 |
| 3,004,476 | 10/1961 | McCullough. | |
| 3,188,475 | 6/1965 | Miller | 250—208 |

WILLIAM W. DYER, JR., *Primary Examiner.*

G. A. DOST, *Assistant Examiner.*